United States Patent
Damink et al.

(10) Patent No.: US 8,314,563 B2
(45) Date of Patent: Nov. 20, 2012

(54) CONSISTENT COLOUR CALIBRATION IN LED-BASED LIGHTING INFRASTRUCTURE

(75) Inventors: Paulus Henricus Antonius Damink, Eindhoven (NL); Sel Brian Colak, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 207 days.

(21) Appl. No.: 12/863,208

(22) PCT Filed: Jan. 20, 2009

(86) PCT No.: PCT/IB2009/050187
§ 371 (c)(1),
(2), (4) Date: Jul. 16, 2010

(87) PCT Pub. No.: WO2009/093165
PCT Pub. Date: Jul. 30, 2009

(65) Prior Publication Data
US 2010/0315010 A1    Dec. 16, 2010

(30) Foreign Application Priority Data

Jan. 23, 2008  (EP) .................................... 08150562

(51) Int. Cl.
*H05B 37/02*   (2006.01)
(52) U.S. Cl. .......... 315/149; 315/151; 315/77; 315/152; 362/277; 362/601; 362/602
(58) Field of Classification Search .................. 315/294, 315/77, 152, 151, 307, 149, 309; 362/227, 362/601, 602, 630
See application file for complete search history.

(56) References Cited

U.S. PATENT DOCUMENTS

| 6,507,159 | B2 * | 1/2003 | Muthu | 315/307 |
| 6,600,562 | B1 * | 7/2003 | Chang | 356/405 |
| 7,230,222 | B2 * | 6/2007 | Cheng et al. | 250/205 |
| 7,315,139 | B1 | 1/2008 | Selvan et al. | |
| 7,319,298 | B2 * | 1/2008 | Jungwirth et al. | 315/307 |
| 8,022,632 | B2 * | 9/2011 | Schulz et al. | 315/149 |
| 8,089,221 | B2 * | 1/2012 | Schulz et al. | 315/307 |
| 2002/0071161 | A1 | 6/2002 | Perkins et al. | |
| 2005/0062446 | A1 | 3/2005 | Ashdown | |
| 2007/0008258 | A1 | 1/2007 | Yamamoto | |
| 2010/0315007 | A1 * | 12/2010 | Schulz et al. | 315/152 |

FOREIGN PATENT DOCUMENTS

| JP | 2004297425 A | 10/2004 |
| WO | 2006111930 A2 | 10/2006 |

* cited by examiner

*Primary Examiner* — Vibol Tan
(74) *Attorney, Agent, or Firm* — Mark L. Beloborodov

(57) ABSTRACT

The present invention relates to color generation in an indoor or outdoor lighting device, and more particularly to a control method which provides spatially consistent color control of a lighting device designed for use in, e.g., spatially extended premises or environments containing obstacles, and thus including multiple light sensors to allow efficient control. Color consistency is achieved by an arrangement where light of one or more of the light sources impinges on more than one light sensor. If constructional detector features, such as filter characteristics, coincide, then these sensors should in principle, after the appropriate processing, report identical color points of the light source under consideration. Indeed, color is a path-independent property of light, and this is the basis for a mutual calibration scheme of the detectors according to the invention. The calibration scheme is part of a control algorithm and is intended for use in place of a conventional control algorithm, either intermittently or permanently.

16 Claims, 1 Drawing Sheet

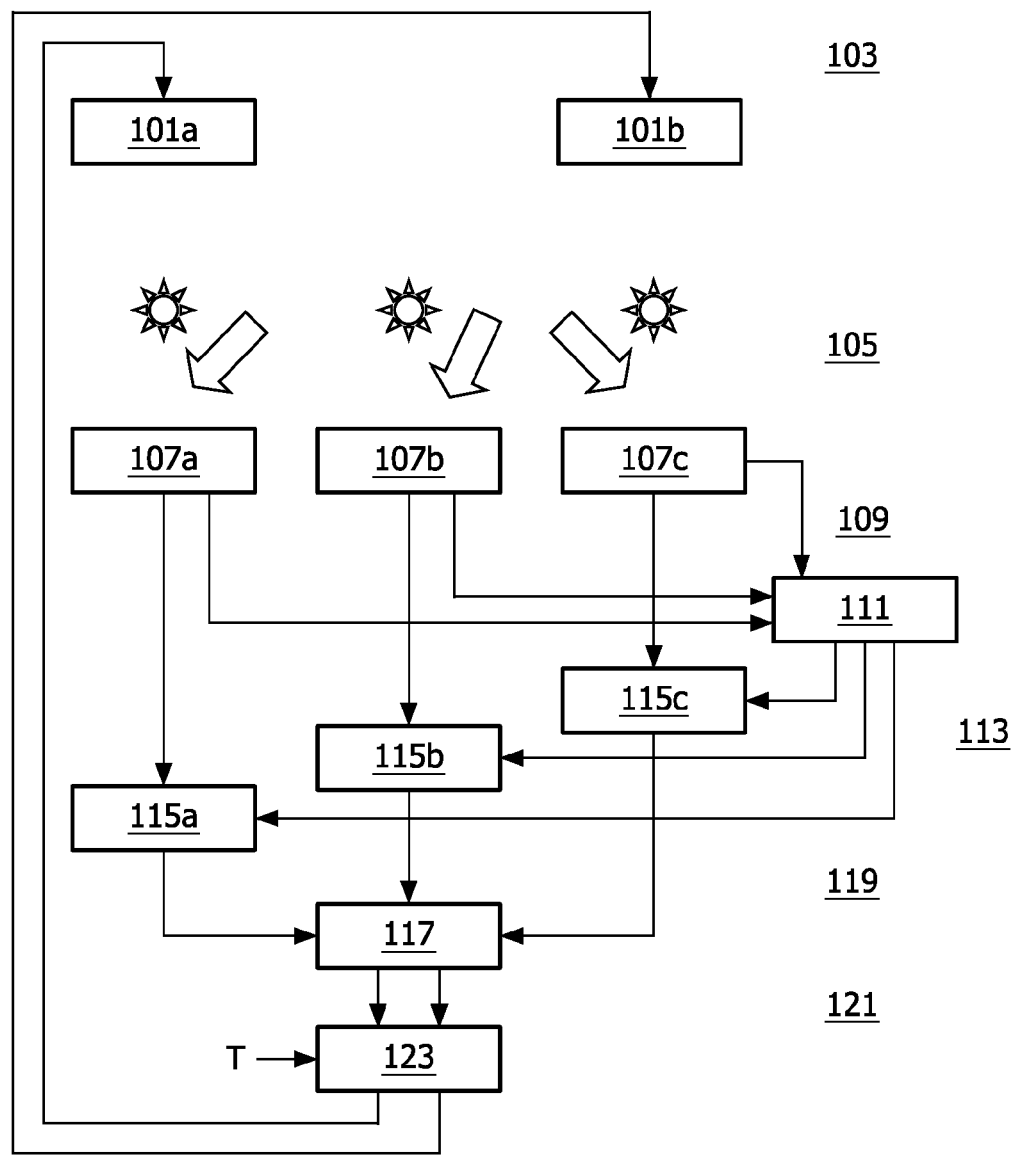

CONSISTENT COLOUR CALIBRATION IN LED-BASED LIGHTING INFRASTRUCTURE

FIELD OF INVENTION

The present invention relates to colour generation in an indoor or outdoor lighting device, and more particularly to a control method which provides spatially consistent colour control of such a lighting device.

BACKGROUND OF THE INVENTION

In order to realise a light source that provides light of a colour which is not a primary colour of its constituent light-emitting elements, a control method for combining the available light components is necessary. The control method can be quite simple or even deterministic if traditional lighting equipment, such as incandescent or fluorescent lamps, are utilised. The situation is more complicated when solid-state lighting means, such as light-emitting diodes (LEDs), are used, since these will exhibit a non-constant colour output. The emitted colour can in fact be influenced by changes in the junction temperature and the current, by ageing and contamination. Moreover, the outputs from two LEDs of the same type will also differ as a consequence of manufacturing defects and their mountings. As the light output starts to wane from the predefined colour point owing to the said factors, the colour point of the light output of the light source will deviate. Hence, the colour point of the light source has to be stabilised via a control loop.

For the purpose of monitoring the light output of one or more light sources, it is common practice to use photodetectors, such as RGB sensors or true-colour sensors, having the same sensitivity as a standard observer or approximating these characteristics. Alternatively, flux sensors are used, possibly in combination with one or more temperature sensors. Based on the photodetector output signals, a resulting colour point of the light output of the light source is determined and compared with a target colour point in order to adjust the driving signals to the light sources if needed.

When the photodetectors sense the light output, there may be interference from other light, such as ambient sunlight or light from artificial sources. It is necessary to remove such elements from the detector signal, so that only the light output of one light source at a time is fed into the control loop. It is known in the art how this difficulty can be overcome if the individual light sources are made distinguishable by modulating each of them in a unique way.

However, photodetectors suffer from similar inconsistencies as light sources do. The effects discussed above, especially the variations between individual components, will lead to a discrepancy between measurements of different detectors. For this reason, when two nominally identical lighting devices according to the described technology are set to produce the same target colour point, it may well happen that the respective light colours will differ visibly to a human eye. This shortcoming is of little consequence as long as the lighting devices are installed separately, but will be an annoying problem when a number of similar light sources are installed for the illumination of larger rooms, such as lobbies or hallways, and a uniform colour temperature is desired.

SUMMARY OF THE INVENTION

It is an object of the present invention to provide a spatially consistent method for controlling the colour of light emitted by lighting equipment in the form of one or more light sources for which multiple photodetectors are needed. Multiple detectors are necessary, for instance, if the lighting equipment is intended for spatially extended premises or if the illuminated environment contains obstacles.

This object is achieved by providing an arrangement where light of one or more of the light sources impinges on more than one photodetector. If constructional detector features, such as filter characteristics, coincide, then these detectors should in principle, after the appropriate processing, report identical colour points of the light source under consideration. Indeed, colour is a path-independent property of light, and this is the basis for a mutual calibration of the detectors according to the invention.

Thus, in accordance with one aspect of the invention, there is provided a method for controlling the colour of light emitted by at least one light source. The method includes the steps of receiving, at more than one photodetector, modulated light emitted by said at least one light source, which modulation permits discrimination of light emitted by each of the light sources, thereby producing a detection signal from each detector;

generating a correction to each detection signal on the basis of a comparison of groups of detection signals from the photodetectors which measure light from a predetermined light source at a predetermined target colour point;

applying said correction to each detection signal;

determining an actual colour point of each light source on the basis of the corrected detection signals; and generating driving signals to the light sources based on their actual colour points and a target colour point.

The above algorithm, which performs calibration and control, can either be executed when the lighting equipment is turned on, at predefined time intervals or continuously.

According to the method, different measurements on one particular light wave, which are performed by different detectors with nominally identical characteristics, are gathered and compared. Modulation enables different light components received by the photodetector to be separated, since light from each light source is uniquely distinguishable. The dependent claims define preferred embodiments of the invention.

According to a second aspect of the invention, there is provided a device for controlling the colour of light comprising at least two photodetectors, arranged to receive light emitted by at least one light source, each of which produces a detection signal;

means for determining a correction associated with each detection signal on the basis of a comparison of groups of detection signals from the photodetectors which measure light from a predetermined light source at a predetermined target colour point;

means for applying the correction to each detection signal;

means for determining an actual colour point of each light source on the basis of the corrected detection signals; and means for generating the driving signals to the light sources based on their actual colour points and a target colour point.

Preferred embodiments, notably embodiments that include specially suited light sources, are defined by the dependent claims.

Further features of, and advantages with, the present invention will become apparent when studying the appended claims and the following description. Those skilled in the art realise that different features of the present invention can be combined to create embodiments other than those described in the sequel.

BRIEF DESCRIPTION OF THE DRAWINGS

The invention will now be described in more detail and with reference to the appended drawing, which is a block diagram of an embodiment of a colour-controlled lighting device according to the invention.

DETAILED DESCRIPTION OF PREFERRED EMBODIMENTS

An embodiment of the present invention will be described with reference to FIG. 1. A colour-controlling device in accordance with a preferred embodiment of the invention comprises $N \geq 2$ photodetectors 107, which generate respective detection signals 109. The detection signals 109 are fed to correction means 115 applying a correction, which is determined by a unit 111, and subsequently providing the corrected signals 119 to a portion 117 adapted to compute the actual colour points 121 of the light emitted by each light source 101. The device controls the colour of light emitted from $M \geq 1$ light sources 101 by adjusting their respective driving signals 103, which are generated by a control unit 123 on the basis of a desired target colour point T and the actual colour points 121 of the emitted light 105. For the sake of simplicity, the drawing discloses an embodiment with relatively few parts, namely $M=2$ light sources and $N=3$ photodetectors. In practice, many more light sources (and at least some more detectors) are used. For instance, in a typical showroom, hundreds of light sources may be employed.

The means denoted 111, 115, 117 and 123 are typically implemented by way of a processing unit, such as a computer, executing appropriate software code for realising the described functionality of controlling and calibrating. A central computer may be utilised for receiving the detection signals, performing the described processing, generating the required driving signals and transmitting the driving signals to the light sources. Hence, the colour control portion according to a preferred embodiment of the present invention may be implemented with a number of photodetectors and a computer executing appropriate software code.

As indicated in FIG. 1, each photodetector 107 receives light 105 from several controllable light sources 101, as well as perturbations in the form of sunlight and light from artificial sources. In order to determine the actual colour point 121 of a given light source, it is necessary to discriminate its contribution from the various other light components incident to the photodetector. It is known in the art how this discrimination can be achieved, for instance, by juxtaposing a modulated light source at each light source so that both radiation patterns coincide, as described in the patent application WO 2006/111930 A2, or by modulating the light of a single light source. If for instance the light sources are pulsed, the power control is performed by adjusting the duty cycle. Then modulation can consist in pulse-width or pulse-amplitude modulation, on-off modulation, bi-phase modulation, or in more complex coding solutions from CDMA technology, such as modulation by Gold codes. Synchronicity between the light sources and the means for demodulating the detection signals is desirable or even necessary in most modulation techniques, and therefore the photodetectors are preferably of a networked type.

In this manner, it is possible to measure the colour and intensity of the light of a particular light source as seen by the photodetectors. The measured intensities will vary for differently located photodetectors, but colour is a path-independent property of light travelling in clean air. Hence, by comparing the colour point of light as it is output from each light source with the desired target colour point T, the device can adjust the driving signals 103 in order to decrease a possible difference.

According to one embodiment of the invention, the determination of the colour points includes approximating the output of each light source by an algorithm for asymmetric function modelling. For example, a double sigmoidal function can be fitted to the known points of the spectral density function of the emitted light.

According to the invention, the described control procedure is supplemented by a calibration of the photodetectors 107 to ensure consistent colour measurements. An execution of the calibration scheme will produce N corrections 113, possibly colour-dependent, which subsequently will be applied to the corresponding detection signals 109 by the correction means 115. For the description of different calibration methods which now follows, some mathematical notation will be introduced. It is understood that the detection signals, which will be discussed along with their corrections, are not necessarily the total output from the photodetectors but only the colour component. This convention is unrestrictive in view of the fact that a light wave, as seen by a photodetector, can be exhaustively represented by a three-component signal, for instance an RGB or XYZ signal. It is straightforward to convert such a signal into one intensity component (known as luminance in a widespread model used in video technology) and two colour components (chrominance). We further assume that comparison will only take place with respect to detectors which are comparable by construction. In the particular case of filtered photodetectors, their filter characteristics should substantially coincide, at least near the wavelengths of the reference light, if a reliable calibration is to take place.

Let us denote by $s_{i,k}(p)$, where $1 \leq i \leq N$ and $1 \leq k \leq M$, the detection signal provided by the $i^{th}$ detector as it receives light from the $k^{th}$ light source at a target colour point p, and by $c_i(p)$ the additive correction associated with the $i^{th}$ photodetector. Moreover, let $G_k$, where $1 \leq k \leq M$, be the index set of the detectors which receive light from the $k^{th}$ light source above some predetermined minimum intensity. For instance, if the first light source is seen by detectors 1, 2 and 4, then $G_1 = \{1, 2, 4\}$. With these definitions we introduce the relative error $$e_{i,j,k}(p) = \begin{cases} |s_{i,k}(p) + c_i(p) - s_{j,k}(p) - c_j(p)| & \text{if } i, j \in G_k, \\ 0 & \text{otherwise,} \end{cases}$$

which is the deviation between the $i^{th}$ and $j^{th}$ detectors while receiving light from the $k^{th}$ light source at a target colour point p. If x is a vector with d components, one can understand $|x| = \sqrt{x_1^2 + \ldots + x_d^2}$, but other norms can be used as well. Note that $e_{i,j,k}(p) = e_{j,i,k}(p)$ and $e_{i,i,k}(p) = 0$.

According to a simple approach, the corrections $c_i(p)$, where $1 \leq i \leq N$, are determined by linearly traversing the set of detectors. A typical calibration scheme has the following structure:

Set $c_1(p) = 0$.
Find $k_2$ such that $2,3 \in G_{k_2}$.
Choose $c_2(p)$ such that $e_{2,3,k_2}(p) = 0$.
Find $k_3$ such that $3,4 \in G_{k_3}$.
Choose $c_3(p)$ such that $e_{3,4,k_3}(p) = 0$.
. . .
Find $k_N$ such that $N-1, N \in G_{k_N}$.
Choose $c_N(p)$ such that $e_{N-1,N,k_N}(p) = 0$.

When using a large number of detectors, this somewhat "near-sighted" algorithm can lead to an oscillatory behaviour of the corrections for photodetectors located at a distance far from the starting point. Hence, for calibrating a number of detectors arranged in a row, which is often the case in practice, a better choice of starting point is near the centre of the row, and for calibrating light sources installed in, say, corridors, the algorithm should start at the photodetector which is closest to their main intersection.

In a more refined embodiment, the corrections are determined simultaneously by a global optimisation process. Define the error q-norm as $$E_q(p) = \begin{cases} \left(\sum_{i=1}^{N}\sum_{j=i+1}^{N}\sum_{k=1}^{M}(e_{i,j,k}(p))^q\right)^{1/q} & \text{if } 1 \le q < \infty, \\ \max_{i,j,k} e_{i,j,k}(p) & \text{if } q = \infty, \end{cases}$$

For given p and q, the corrections $c_i(p)$, where $1 \le i \le N$, are solutions to the optimisation problem $$\min_{c_1(p),\ldots,c_N(p)} E_q(p).$$

The number q can be chosen freely according to the requirements of the application, the signal coding system, aesthetic considerations, etc. However, three particular q-norms are commonly used: for q=2 the corrections will be optimal in the least-squares sense; for q=1 they minimise the total absolute error; and for q=∞ they minimise the maximum error.

The resulting corrections $c_i(p)$, where $1 \le i \le N$, are stored in the correcting means or elsewhere and are applied to the detection signals until a new calibration has been performed. The above calibration method is based on measurements for one target colour point p. It is obvious to those skilled in the art, firstly, that the algorithm can be repeated for several colours (either by storing the measured signals in memory or by performing them in a specific calibration mode when visible colour variations are acceptable) and, secondly, that it is possible to interpolate between known corrections.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method for controlling the colour of light emitted by at least one light source, said method comprising the steps of
    receiving, at more than one photodetector, modulated light emitted by said at least one light source, which modulation permits discrimination of light emitted by each of the light sources, thereby producing a detection signal from each detector;
    generating a correction to each detection signal on the basis of a comparison of groups of detection signals from the photodetectors which measure light from a predetermined light source at a predetermined target colour point;
    applying said correction to each detection signal;
    determining an actual colour point of each light source on the basis of the corrected detection signals; and
    generating driving signals to the light sources based on their actual colour points and a target colour point.

2. A method according to claim 1, wherein said one or more light sources emit light by means of at least one solid-state light element.

3. A method according to claim 2, wherein said solid-state light element is a light-emitting diode.

4. A method according to claim 1, wherein light is received by means of at least one filtered photodetector.

5. A method according to claim 4, wherein said at least one filtered photodetector is one of RGB sensors, XYZ sensors and flux sensors.

6. A method according to claim 1, wherein the modulation is performed according to one method in the group consisting of
    spread spectrum modulation of the driving signals, CDMA modulation of the driving signals, pulse-width modulation, On-Off keying, Bi-Phase modulation, modulation by Gold codes.

7. A method according to claim 1, wherein said corrections are determined according to an algorithm adapted to decrease the error between data from different photodetectors in the least-squares sense.

8. A method according to claim 1, wherein said corrections are determined according to an algorithm adapted to decrease the maximum error between data from different photodetectors.

9. A method according to claim 1, wherein said corrections are determined according to an algorithm adapted to decrease the total absolute error between data from different photodetectors.

10. A method according to claim 1, wherein determining an actual colour point of a light source comprises approximating its spectral output by means of an algorithm for asymmetric function modelling.

11. A device for controlling the colour of light comprising
    at least two photodetectors (107), arranged to receive light (105) emitted by at least one light source, each of which produces a detection signal (109);
    means (111) for determining a correction (113) associated with each detection signal on the basis of a comparison of groups of detection signals (109) from the photodetectors (107) which measure light from a predetermined light source at a predetermined target colour point;
    means (115) for applying the correction (113) to each detection signal (109);
    means (117) for determining an actual colour point (121) of each light source on the basis of the corrected detection signals (119); and
    means (123) for generating the driving signals (103) to the light sources based on their actual colour points (121) and a target colour point (T).

12. A device according to claim 11, which further comprises one or more light sources (101) controllable by the driving signals (103), each source being arranged to emit modulated light (105), which modulation permits discrimination of the light.

13. A device according to claim 12, wherein said one or more light sources emit light by means of at least one solid-state light element.

14. A device according to claim 13, wherein said solid-state light element is a light-emitting diode.

15. A device according to claim 11, wherein light is received by at least one filtered photodetector.

16. A device according to claim 15, wherein said at least one filtered photodetector is one of RGB sensors, XYZ sensors and flux sensors.

* * * * *